United States Patent [19]
Michaelson

[11] 3,785,053
[45] Jan. 15, 1974

[54] COMBINATION SAW
[75] Inventor: Dennis M. Michaelson, Chicago, Ill.
[73] Assignee: Pan-Technic, Inc., Chicago, Ill.
[22] Filed: July 7, 1972
[21] Appl. No.: 269,767

[52] U.S. Cl. .................................................. 30/394
[51] Int. Cl. .......................................... B27b 19/08
[58] Field of Search ...................... 30/392, 393, 394, 30/166, 375

[56] References Cited
UNITED STATES PATENTS
2,619,132  11/1952  Pierce ................................... 30/394
3,494,390  2/1970  Dudek ................................... 30/394
3,044,171  7/1962  Cecere ................................... 30/166
3,448,781  6/1969  Angelucci ............................. 30/392

Primary Examiner—Othell M. Simpson
Assistant Examiner—J. C. Peters
Attorney—Hill, Sherman, Meroni, Gross & Simpson

[57] ABSTRACT

A combination saw which can be used as a saber or jig saw and which has a main body portion with a handle and a power output portion rotatable to different angular positions relative to the main body portion and handle.

4 Claims, 3 Drawing Figures

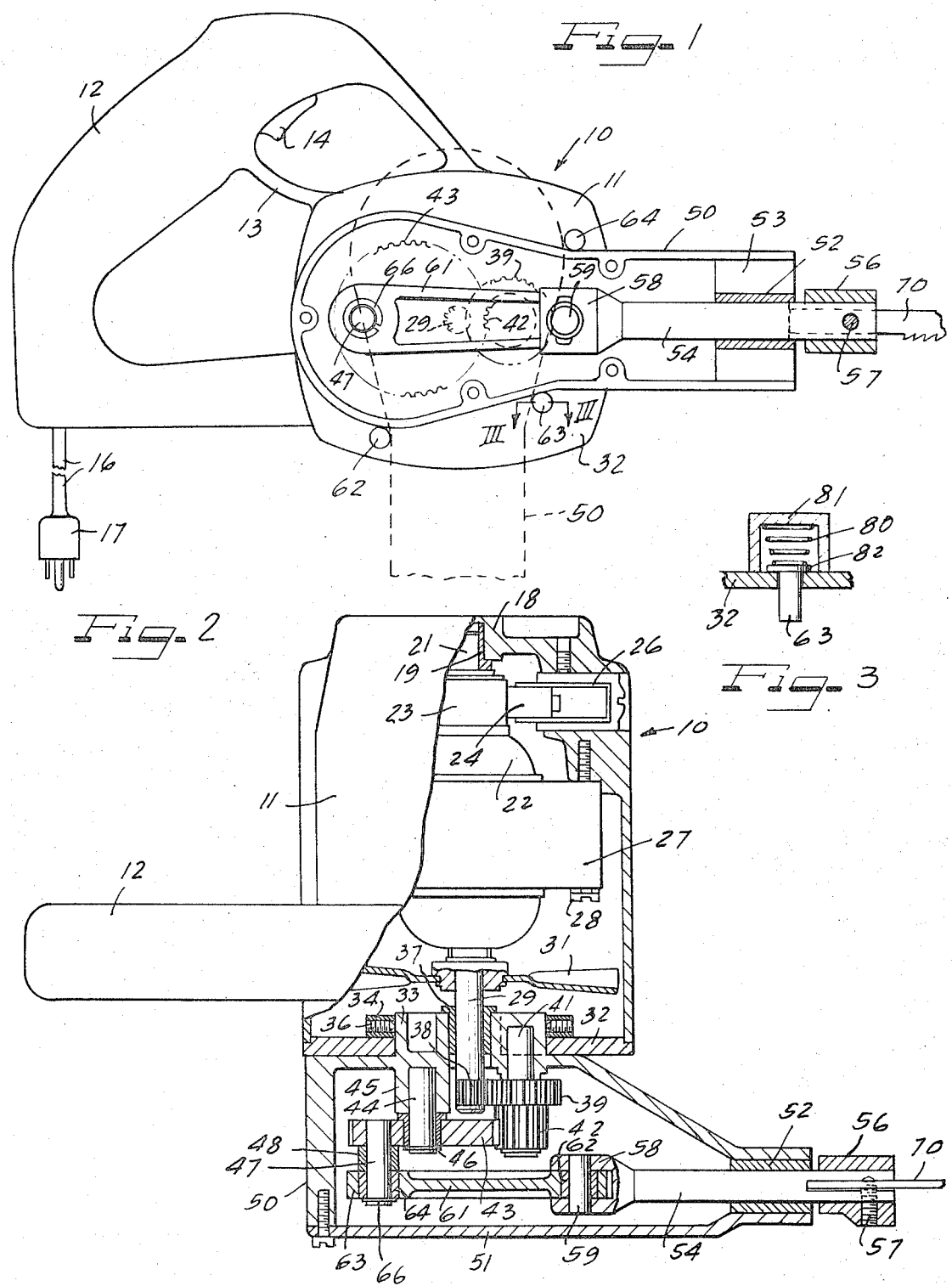

COMBINATION SAW

BACKGROUND OF THE INVENTION

1. Field of the Invention

This invention relates in general to saws and in particular to a combination saw usable in different manners.

2. Description of the Prior Art

Power saws have been known for some time and take the forms of rotary saws, saber saws or jig saws. However, for a carpenter to have a complete complement of tools he is required to have a rotary saw, a saber saw and a jig saw.

SUMMARY OF THE INVENTION

It is an object of the present invention to provide a combination saw which may be utilized as a jig and saber saw thus eliminating the requirement that a carpenter have two separate power instruments rather than the combination instrument of the present invention. The present invention comprises a main body portion which includes a motor and handle portion which is coupled to a rotatably mounted saw holding mechanism which allows the saw to be locked in various angular relationships with the body portion without affecting the coupling of the driving motor to the saw. Thus, the user can set the saw blade at the desired angular relationship to the main body portion and lock it in place and then use the saw as either a saber or jig saw depending upon the particular requirement at a particular time.

The ability to rotate the saw blade relative to the main body portion and handle of the machine allows easier access into confined locations and gives greater flexibility for the tool.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a side view of the invention with the cover plate removed;

FIG. 2 is a partially cut-away top view of the saw of this invention; and

FIG. 3 is a detail view of the locking pin.

DESCRIPTION OF THE PREFERRED EMBODIMENTS

FIG. 1 illustrates the combination saw of this invention designated generally as 10 which includes a main body portion 11 to which is attached a handle 12. A partition 13 divides the handle in two portions and a trigger 14 is provided in the handle for actuating the saw. Extension cord 16 has a power plug 17 for connection to a suitable electrical outlet.

As best shown in FIG. 2, the portion 11 has an end wall 18 which carries a bearing 19 in which a motor shaft 21 is rotatably supported. Motor 22 has a commutator 23 engageable by a brush 24 mounted in a brush holder 26 of the member 11. A bracket 27 supports the motor 22 to the case 11 by set screws 28. The other end of the motor shaft 29 carries a fan 31 and is rotatably mounted in a sleeve bearing 37 which is mounted in an output power unit 50. The output power unit 50 is rotatably mounted relative to the case 11 and has an extension 33 which extends into the case 11 and is locked therein by set screws 36 mounted in a ring 34. The ends of the set screws engage the portion 33 of the member 50 and attach it to the case 11.

The end of the shaft 29 extends into the working member 50 and is formed with a gear 38 that meshes with a gear 39 rotatably supported on a shaft 41 in portion 33 of the working member 50. A second gear 43 meshes with gear 42 mounted on shaft 41 and is rotatably supported by bearing 46 on shaft 44 which is mounted in a sleeve 45 of member 50. Gear 43 has a crank arm shaft 47 eccentrically mounted thereon which carries a washer 48 and passes through a crank arm 61 having an end portion 63 with a bearing 64 through which shaft 47 extends. A washer 66 attaches the crank arm 61 to the crank shaft 47. A power shaft 54 is formed with a bifurcated portion 58 and the crank arm 61 has its other end portion attached to the power shaft 54 by a pin 59. The power shaft 54 is mounted to the working portion 50 by a slide bearing 52 which is mounted in a holding bracket 53 at the end of the working member 50. The end of shaft 54 is hollow and is formed with a bracket 56 through which a set screw 57 extends for locking a saw into the end of the shaft tr. The saw might be a jig or saber saw blade.

As best shown in FIG. 1 a pair of pins 62 and 64 extend from the end 32 of case 11. A third pin 63 is mounted as shown in FIG. 3 and is pressable against a spring to allow the working portion 50 of the saw to be moved from a first position as shown in solid line in FIG. 1 to the position as shown in dotted line in FIG. 1. In other words, when the saw is in the first position the pin 64 bears against the upper edge relative to FIG. 1 of the working portion and prevents the working portion from rotating counterclockwise relative to FIG. 1. Simultaneously, the pin 63 engages the under portion of member 50 relative to FIG. 1 and prevents working portion 50 from rotating clockwise relative to FIG. 1 and thus the saw may be utilized with the blade in the position as shown in FIG. 1.

By depressing the pin 63, the working member 50 may be moved to the vertical position relative to FIG. 1 such that the pin 62 prevents the working member from rotating clockwise relative to FIG. 1 and the pin 63 prevents the working member for rotating counterclockwise relative to FIG. 1. It is to be noted that the working member rotates about the center of the projection 33 on the shaft 29 of the motor. Thus the center of the shaft 29 is the center of pivot of the working member 50 as it rotates from the first to the second position.

A cover member 51 covers the end of the working member 50 and is attached by set screws, as shown, to the working member.

FIG. 3 is a detailed sectional view of locking pin 63. Pin 63 has a head 82 which bears against spring 80. Spring 80 is mounted in cylindrical member 81. Member 81 is attached on the inside of end 32 as shown.

In operation, a blade may be inserted into the chuck 56 by loosening the set screw 57 and then tightening it on the blade 70 and if the working member 50 is in the position shown in solid line in FIG. 1 the saw may be operated with the handle and the working member in the relationship as shown wherein the blade extends generally in the horizontal direction relative to FIG. 1.

If desired, the pin 63 may be depressed to clear the working portion 50 such that the blade and working portion may be rotated to the dotted position shown in FIG. 1 and the pin will then extend from the end 32 of the case 11 to lock the saw in the dotted position relative to FIG. 1.

It is seen that this invention provides a combination saw in which the angular position of the blade relative to the handle may be adjusted as desired.

Although it has been described with respect to preferred embodiments it is not to be so limited as changes and modifications may be made therein which are within the full intent and scope as defined by the appended claims.

I claim:

1. A power tool comprising: a main body portion; a handle attached thereto; a tool holding portion rotatably attached to said main body portion and lockable at different angular positions relative to said main body portion; a tool holder reciprocally mounted relative to said tool holding portion; driving means mounted in said main body portion and coupled to said tool holder to drive it back and forth, wherein said driving means has an output shaft which extends into said tool holding portion at the center of pivot of said tool holding portion relative to said main body portion, wherein said main body portion is formed with a circular opening about said output shaft of said driving means and said tool holding portion is formed with a cylindrical shoulder which is receivable within said circular opening and a locking ring attached to said shoulder within said main body portion to rotatably attach said tool holding portion to said main body portion, wherein stop means lock said tool holding portion at different angular positions and said stop means comprise three projections on said main body portion such that two of said projections define angular limits for said tool holding portion relative to said main body portion and said third projection movable to a first position to allow angular movement of said tool holding portion and to a second position to lock said tool holding portion.

2. A power tool according to claim 1 wherein said third projection is movably mounted in said main body portion and spring biased to said second position.

3. A power tool according to claim 1 wherein a first gear is mounted on the output end of said output shaft of said driving means, a crank gear driven by said first gear, and a crank arm connected between said crank gear and said tool holder.

4. A power tool according to claim 2 wherein said crank gear is drivien by said first gear through second and third gears attached to each other on a common shaft supported by said tool holding portion and said second gear in mesh with said first gear and said third gear in mesh with said crank gear.

* * * * *